(12) United States Patent
Takayama et al.

(10) Patent No.: US 10,101,355 B2
(45) Date of Patent: Oct. 16, 2018

(54) METHOD AND DEVICE FOR CALCULATING VELOCITY

(71) Applicant: Furuno Electric Co., Ltd., Nishinomiya (JP)

(72) Inventors: Youji Takayama, Nishinomiya (JP); Hiroyuki Toda, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 297 days.

(21) Appl. No.: 14/781,895

(22) PCT Filed: Mar. 11, 2014

(86) PCT No.: PCT/JP2014/056238
§ 371 (c)(1),
(2) Date: Oct. 1, 2015

(87) PCT Pub. No.: WO2014/167929
PCT Pub. Date: Oct. 16, 2014

(65) Prior Publication Data
US 2016/0061854 A1    Mar. 3, 2016

(30) Foreign Application Priority Data
Apr. 12, 2013    (JP) ................................. 2013-083980

(51) Int. Cl.
*G01P 3/00* (2006.01)
*G01C 21/00* (2006.01)
(Continued)

(52) U.S. Cl.
CPC ................ *G01P 3/00* (2013.01); *G01C 21/00* (2013.01); *G01P 3/66* (2013.01); *G01P 3/803* (2013.01)

(58) Field of Classification Search
CPC ... G01P 3/00; G01P 3/66; G01P 3/803; G01C 21/00
See application file for complete search history.

(56) References Cited

U.S. PATENT DOCUMENTS 5,301,130 A * 4/1994 Alcone .................. B60T 8/171
188/DIG. 1
5,935,191 A    8/1999 Sakanashi et al.
(Continued)

FOREIGN PATENT DOCUMENTS

CN    101801755 A    8/2010
CN    102023232 A    4/2011
(Continued)

OTHER PUBLICATIONS

European Patent Office, Extended European Search Report Issued in Application No. 14782968.3, dated Nov. 3, 2016, Germany, 9 pages.
(Continued)

*Primary Examiner* — Manuel L Barbee
(74) *Attorney, Agent, or Firm* — Alleman Hall Creasman & Tuttle LLP (57) ABSTRACT

A velocity calculating device is provided, which can accurately calculate a moving velocity of a movable body without depending on signals obtained externally. A navigation device includes an acceleration acquiring module, an angular velocity acquiring module, a time difference detecting module, and a velocity calculating module. The acceleration acquiring module acquires the vertical acceleration of one of the axle of the front wheels and the axle of the rear wheels. The angular velocity acquiring module acquires a pitch angular velocity of the automobile. The time difference detecting module detects a time difference between the acceleration in the vertical directions and the pitch angular velocity. The velocity calculating module calculates a mov- (Continued)

ing velocity of the automobile based on a rate of a wheelbase with respect to the time difference.

20 Claims, 4 Drawing Sheets

(51) Int. Cl.
*G01P 3/66* (2006.01)
*G01P 3/80* (2006.01)

(56) References Cited

U.S. PATENT DOCUMENTS

| | | | |
|---|---|---|---|
| 2010/0057360 A1* | 3/2010 | Ohkubo | G01C 21/16 |
| | | | 701/500 |
| 2010/0198448 A1 | 8/2010 | Ono et al. | |
| 2011/0066376 A1 | 3/2011 | Takaoka | |
| 2011/0136512 A1 | 6/2011 | Ohkubo | |

FOREIGN PATENT DOCUMENTS

| | | |
|---|---|---|
| CN | 102087299 A | 6/2011 |
| DE | 19728109 A1 | 2/1999 |
| DE | 10354944 A1 | 6/2005 |
| EP | 2161582 A2 | 3/2010 |
| EP | 2295989 A1 | 3/2011 |
| EP | 2330427 A1 | 6/2011 |
| JP | 09096535 A | 4/1997 |
| JP | 2009067300 A | 4/2009 |
| JP | 2011059065 A | 3/2011 |
| JP | 2011117843 A | 6/2011 |
| TW | 201118338 A | 6/2011 |
| WO | 2009035121 A2 | 3/2009 |

OTHER PUBLICATIONS

ISA Japanese Patent Office, International Search Report Issued in Application No. PCT/JP2014/056238, dated Apr. 15, 2014, WIPO, 4 pages.

* cited by examiner

METHOD AND DEVICE FOR CALCULATING VELOCITY

TECHNICAL FIELD

This disclosure relates to an art of autonomous navigation in which a moving velocity of a movable body is calculated by a GPS navigation device, etc., through using an acceleration sensor and an angular velocity sensor.

BACKGROUND ART

Conventionally, positioning devices for calculating a current position of a movable body itself based on signals from GPS (Global Positioning System) satellites are known. As a specific example of such positioning devices, a GPS navigation device to be attached to a vehicle body of an automobile can be given. Such a navigation device calculates a current position, etc., of the automobile based on signals from the GPS satellites, and displays information of the current position, etc., on a display screen.

With this kind of navigation device, in a situation where the signals from the GPS satellites cannot appropriately be received, such as a case where the automobile is traveling through a tunnel, positioning based on the signals from the GPS satellites cannot appropriately be performed. Thus, general navigation devices are configured to be able to calculate the current position without depending on the signals from the GPS satellites (so-called autonomous navigation).

To achieve the autonomous navigation in the navigation device, information of a moving velocity of the automobile needs to be acquired in some kind of manner. Thus, an acquisition of the information of the moving velocity of the automobile from a speed meter, etc., of the automobile can be considered. However, to acquire the information in the above manner, the vehicle body of the automobile and the navigation device need to be, for example, wired therebetween, which causes a disadvantage that attaching operation of an add-on/portable type navigation device to the vehicle body becomes complicated.

Thus, a configuration is proposed, in which components such as an acceleration sensor, etc., are built in the navigation device and an estimate of the moving velocity of the automobile is calculated based on the information of the sensors.

In this regard, Patent Document 1 discloses an equation $VT=D/\Delta T$ (Equation 1 in Patent Document 1) based on a perspective that a general relationship among time, distance and velocity can be established among a time difference $\Delta T$ between an acceleration of a vehicle in an orthogonal direction to a traveling surface and a pitch rate (pitch angular velocity) of the vehicle, a distance D from a mounted position of the navigation device to a position where the pitch angular velocity is assumed to cause effect, and a velocity VT of the vehicle. Upon the establishment of this equation, Patent Document 1 discloses a velocity calculating device for calculating the velocity VT based on the rate of the distance D with respect to the time difference $\Delta T$. Thereby, Patent Document 1 concludes that a velocity of a movable body can accurately be calculated.

REFERENCE DOCUMENT OF CONVENTIONAL ART

Patent Document

Patent Document 1: JP2011-117843A

DISCLOSURE OF THE INVENTION

Problems to be Solved by the Invention

As described above, in Patent Document 1, the velocity VT of the movable body is calculated by having a parameter "the distance D from the mounted position of the navigation device to the position where the pitch angular velocity is assumed to cause effect." In Patent Document 1, the pitch angular velocity is assumed to cause effect on a median of front and rear axles. Therefore, Equation 1 of Patent Document 1 can properly be applied only in the case where the pitch angular velocity causes effect on the median of the front and rear axles. However, for example in a case where only the rear wheels are moved in vertical directions while the positions of the front wheels in the vertical directions do not change, since the vehicle body turns with respect to the positions of the front wheels, the pitch angular velocity can be assumed to cause effect on the positions of the front wheels. On the contrary, in a case where only the front wheels are moved in the vertical directions while the positions of the rear wheels in the vertical directions do not change, since the vehicle body turns with respect to the positions of the rear wheels, the pitch angular velocity can be assumed to cause effect on the positions of the rear wheels. Thus, the position on which the pitch angular velocity is assumed to cause effect changes depending on a mode of the posture change of the vehicle body. Further, the mode of the posture change of the vehicle body may change as needed. Therefore, with Equation 1 of Patent Document 1 under the precondition that the pitch angular velocity causes effect on the median of the front and rear axles, the actual moving velocity of the vehicle body may not accurately be calculated all the time.

Moreover, Patent Document 1 is provided under the precondition that "the general relationship among time, distance and velocity can be established among the time difference $\Delta \tau$, the distance D, and the velocity VT." Although this precondition seems to be satisfied, actually, the source of this precondition is inapparent. Therefore, a condition upon which such a precondition can be satisfied (e.g., whether it is applicable to any kind of automobiles or limited to four-wheeled automobiles, whether it is applicable to two-wheeled vehicle) is also inapparent, and thus the satisfaction of the precondition is unreliable. For this reason, there remains a small doubt in whether the velocity VT of the vehicle can actually be calculated by the method in Patent Document 1.

This disclosure is made in view of the above situations, and aims to provide a velocity calculating device which can accurately calculate a moving velocity of a movable body without depending on a signal obtained externally.

SUMMARY AND EFFECTS OF THE INVENTION

Problems to be solved by this disclosure are described above, and means for solving the problems and effects thereof will be described below.

According to one aspect of this disclosure, the following configuration of a velocity calculating device to be mounted on a movable body having at least a front wheel and a rear wheel and for moving on a traveling surface is provided. Specifically, the velocity calculating device includes an acceleration acquiring module configured to acquire an acceleration of an axle of one of the front and rear wheels in vertical directions of the movable body, an angular velocity acquiring module configured to acquire a pitch angular velocity of the movable body, a time difference detecting module configured to detect a time difference between the acceleration in the vertical directions and the pitch angular velocity, and a velocity calculating module configured to calculate a moving velocity of the movable body based on a rate of a wheelbase with respect to the time difference, the wheelbase being a distance between the axle of the front wheel and the axle of the rear wheel.

In other words, a front wheel and a rear wheel of a vehicle body are moved in the vertical directions because of an unevenness of a road surface, and as a result, a pitch angle of the vehicle body changes. Therefore, a time difference according to a moving velocity of the vehicle body with respect to the road surface and a wheelbase is generated between one of a vertical acceleration of the front wheel and the vertical acceleration of the rear wheel, and a pitch angular velocity of the vehicle body. Thus, the moving velocity (absolute velocity) of the vehicle body with respect to the road surface can accurately be calculated based on a rate of the wheelbase with respect to the time difference.

The velocity calculating device preferably has the following configuration. Specifically, the velocity calculating device includes an acceleration sensor configured to detect the acceleration in the vertical directions, an angular velocity sensor configured to detect the pitch angular velocity, and a case configured to accommodate the acceleration sensor, the angular velocity sensor, the acceleration acquiring module, the angular velocity acquiring module, the time difference detecting module, and the velocity calculating module. The acceleration acquiring module acquires the acceleration in the vertical directions based on an output of the acceleration sensor. The angular velocity acquiring module acquires the pitch angular velocity based on an output of the angular velocity sensor.

By building the acceleration sensor and the angular velocity sensor in the case as described above, an external sensor, etc., do not need to be connected with the velocity calculating device. Thus, the attaching operation of the velocity calculating device, etc., becomes easier.

The velocity calculating device preferably has the following configuration. Specifically, the velocity calculating device includes a GNSS signal acquiring module configured to acquire GNSS signals received from GNSS satellites, a GNSS positioning module configured to perform positioning of a current position of the movable body based on the GNSS signals in a case where the GNSS signals are successfully and appropriately received, and an autonomous navigation module configured to calculate the current position based on the moving velocity calculated by the velocity calculating module, in a case where the GNSS signals are not successfully and appropriately received.

Thereby, regardless of the GNSS signals being received successfully and appropriately, the current position of the movable body can be acquired.

The velocity calculating device preferably has the following configuration. Specifically, the GNSS positioning module is configured to be able to calculate the movable velocity of the movable body based on the GNSS signals in the case where the GNSS signals are successfully and appropriately received. The velocity calculating device includes a wheelbase calculating module configured to calculate the wheelbase based on the moving velocity calculated by the GNSS positioning module and the time difference. The autonomous navigation module calculates the moving velocity of the movable body based on the rate of the wheelbase calculated by the wheelbase calculating module with respect to the time difference.

Thereby, for example, even in a case where the wheelbase is not acquired, by calculating the wheelbase while the GNSS signals are successfully and appropriately received, the moving velocity can be obtained by the velocity calculating module.

The velocity calculating device preferably has the following configuration. Specifically, the velocity calculating device includes a longitudinal acceleration acquiring module configured to acquire an acceleration of the movable body in longitudinal directions thereof. The velocity calculating module calculates the moving velocity of the movable body based on the rate of the wheelbase with respect to the time difference, and the acceleration in the longitudinal directions.

By taking the acceleration in the longitudinal directions of the vehicle body into consideration as described above, the moving velocity can more accurately be obtained.

The velocity calculating module preferably obtains the time difference based on a difference between a timing at which the acceleration in the vertical directions reaches an extremum and a timing at which the pitch angular velocity reaches an extremum.

A difference between a waveform of the vertical acceleration and a waveform of the pitch angular velocity in a time axial direction may be detected to obtain the time difference. However, in a case where the waveforms are directly compared with each other, an operation load becomes higher. Thus, by detecting the extremum of the waveform of the vertical acceleration and the extremum of the waveform of the pitch angular velocity, and obtaining the time difference between the two waveforms, the difference between the waveforms can be detected easily.

According to another aspect of this disclosure, a method of calculating a moving velocity of a movable body having at least a front wheel and a rear wheel and for moving on a traveling surface is provided. Specifically, the method includes acquiring an acceleration of an axle of one of the front wheel and the rear wheel in vertical directions of the movable body, acquiring a pitch angular velocity of the movable body, detecting a time difference between the acceleration in the vertical directions and the pitch angular velocity, and calculating a moving velocity of the movable body based on a rate of a wheelbase with respect to the time difference, the wheelbase being a distance between the axle of the front wheel and the axle of the rear wheel.

MODE(S) FOR CARRYING OUT THE INVENTION

Figure 1:
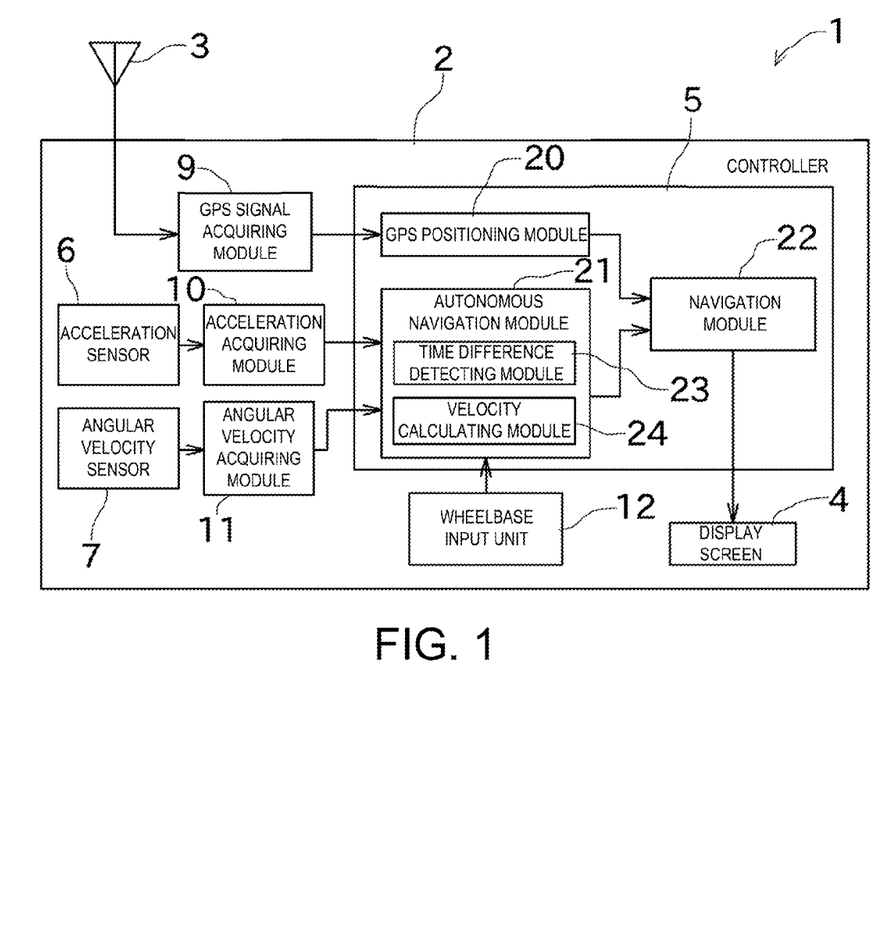
FIG. 1 is a block diagram illustrating a navigation device according to one embodiment of this disclosure.

Next, embodiments of this disclosure are described with reference to the appended drawings. FIG. 1 is a block diagram of a navigation device 1 as one embodiment of a velocity calculating device according to the present application.

The navigation device 1 of this embodiment is assumed to be used by being attached to a vehicle body (movable body) of an automobile. The navigation device 1 performs positioning of a current position of the vehicle body on the earth by using a satellite positioning system (GNSS), such as a GPS (Global Positioning System), and performs route guidance based on the current position.

The navigation device 1 includes a main body 2 and a GPS antenna 3.

The GPS antenna (GNSS antenna) 3 is fixed to the vehicle body of the automobile, and receives GPS signals (GNSS signals) transmitted by GPS satellites (GNSS satellites). The GPS signals received by the GPS antenna 3 are inputted to the main body 2 via a cable. Obviously, the GPS antenna 3 may be built in the main body 2.

The main body 2 includes a display screen 4, a controller 5, an acceleration sensor 6, an angular velocity sensor 7, a GPS signal acquiring module 9, an acceleration acquiring module 10, and an angular velocity acquiring module 11. Moreover, the main body 2 includes a case (not illustrated) configured to contain the respective components of the navigation device 1 (controller 5, acceleration sensor 6, angular velocity sensor 7, GPS signal acquiring module 9, acceleration acquiring module 10, angular velocity acquiring module 11, etc.). The display screen 4 is provided at an outer surface of the case.

The GPS signal acquiring module (GNSS signal acquiring module) 9 acquires the GPS signals received by the GPS antenna 3, as digital data. The data acquired by the GPS signal acquiring module 9 is outputted to the controller 5.

The acceleration sensor 6 of this embodiment is configured to be detectable of accelerations in three axes. Specifically, the acceleration sensor 6 is detectable of each of an acceleration in longitudinal directions of the vehicle body of the automobile (longitudinal acceleration), an acceleration in lateral axial directions of the vehicle body (lateral acceleration), and an acceleration in vertical axial directions of the vehicle body (vertical acceleration).

The angular velocity sensor 7 of this embodiment is configured to be detectable of angular velocities centering on three axes. Specifically, the angular velocity sensor 7 is detectable of each of a roll angular velocity that is a changing speed of an angle of the vehicle body centering on the longitudinal axis (roll angle), a pitch angular velocity that is a changing speed of an angle of the vehicle body centering on the lateral axis (pitch angle), and a yaw angular velocity that is a changing speed of an angle of the vehicle body centering on the vertical axis (yaw angle).

The acceleration acquiring module 10 is configured to acquire data indicating magnitudes of the longitudinal acceleration, the lateral acceleration, and the vertical acceleration, respectively, by sampling the output signal of the acceleration sensor 6 at a predetermined sampling cycle (100 Hz in this embodiment). The angular velocity acquiring module 11 is configured to acquire data indicating magnitudes of the roll angular velocity, the pitch angular velocity, and the yaw angular velocity, respectively, by sampling the output signal of the angular velocity sensor 7 at a predetermined sampling cycle (100 Hz in this embodiment). The data acquired by the acceleration acquiring module 10 and the angular velocity acquiring module 11 is respectively outputted to the controller 5.

The controller 5 is configured as a computer comprised of hardware, such as a CPU, ROM(s) and RAM(s), and software, such as program(s) stored in the ROM(s). The controller 5 of this embodiment functions as a GPS positioning module 20, an autonomous navigation module 21, a navigation module 22, etc., by the hardware and software operating in cooperation with each other.

The GPS positioning module (GNSS positioning module) 20 is configured to perform the positioning of the current position of the vehicle body based on the data of the GPS signals acquired by the GPS signal acquiring module 9. Further, the GPS positioning module 20 is configured to be obtainable of a moving velocity of the vehicle body based on the data of the GPS signals acquired by the GPS signal acquiring module 9. The moving velocity calculated based on the GPS signals is referred to as the GPS velocity $V_{GPS}$. Note that, the description of the method of the positioning and velocity calculation based on the GPS signals is omitted since they are known.

The autonomous navigation module 21 is configured to be able to calculate the current position of the vehicle body without depending on the signals from the GPS satellites. Specifically, the autonomous navigation module 21 detects a change in traveling direction of the vehicle body based on the yaw angular velocity acquired by the angular velocity acquiring module 11, and calculates a current traveling direction of the vehicle body based on the detected change. Moreover, the autonomous navigation module 21 calculates the moving velocity of the vehicle body based on the vertical acceleration acquired by the acceleration acquiring module 10 and the pitch angular velocity acquired by the angular velocity acquiring module 11 (described later in detail). Further, the autonomous navigation module 21 calculates the current position of the vehicle body based on the traveling direction and the moving velocity obtained as described above.

In a case where the GPS signals are successfully and appropriately received by the GPS antenna 3 (in a case where a required signal level and a required number of satellites are successfully secured), the GPS positioning module 20 obtains the current position of the vehicle body based on the GPS signals. On the other hand, in a case where the GPS signals are not successfully and appropriately received (e.g., when the signal level decreases or the required number of satellites cannot be secured, such as when the vehicle body is traveling through a tunnel), the autonomous navigation module 21 calculates the current position without depending on the GPS signals. By the GPS positioning module 20 and the autonomous navigation module 21 operate to compensate each other as above, the current position of the vehicle body can be acquired regardless of the reception situation of the GPS signals.

The navigation module 22 performs various kinds of processing regarding navigation, such as displaying the current position on a map on the display screen 4 and searching for a route from the current position to a destination, based on the current position acquired by one of the GPS positioning module 20 and the autonomous navigation module 21. Note that, detailed description of a navigation device having such a navigation function is omitted since it is known.

Subsequently, a principle of the velocity calculating method that is a characteristic of the present application is described.

Figure 2:
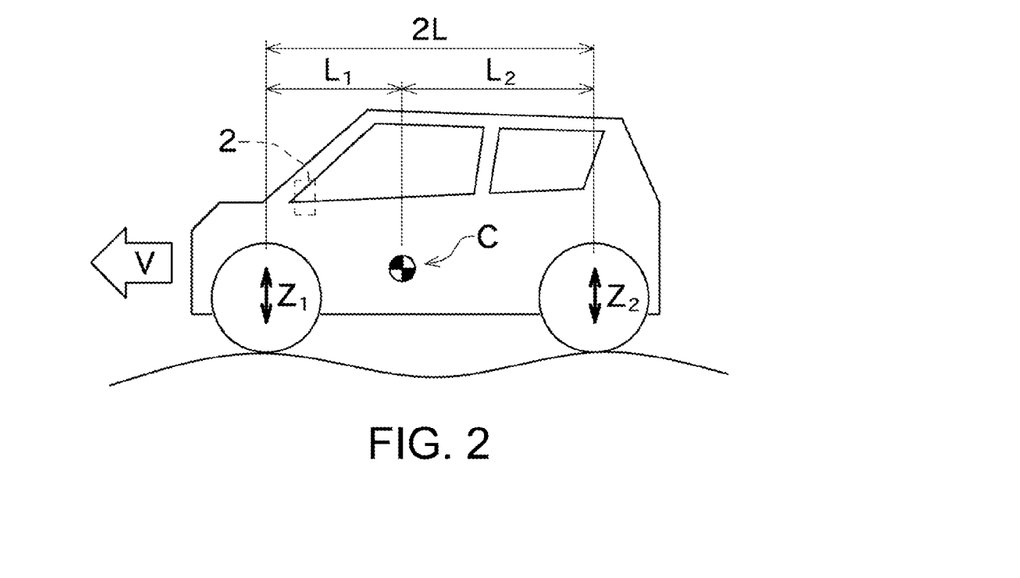
FIG. 2 is a view illustrating a model of a vehicle body.

As described above, the velocity calculating method described in Patent Document 1 has a disadvantage in being unreliable since the condition to serve as a precondition is inapparent. Thus, in the following description, a model of the vehicle body as illustrated in FIG. 2 is set as a precondition, and an equation for calculating the moving velocity of the vehicle body is derived based on the model. Specifically, in this model, 1. the vehicle body is a rigid body,
2. the vehicle body is provided with at least front and rear wheels,
3. the vehicle body travels at a constant moving velocity V,
4. a distance from a center of gravity C of the vehicle body to an axle of the front wheels is $L_1$ and a distance from the center of gravity C to an axle of the rear wheels is $L_2$, and
5. a distance between the axle of the front wheels and the axle of the rear wheels (wheelbase) is 2L ($2L=L_1+L_2$).

Generally, a road surface where the vehicle body travels (traveling surface) has unevenness. Since the vehicle body moves on the road surface, the front wheels are moved in the vertical directions by passing through the unevenness. A vertical moved amount of the axle of the front wheels caused here is $Z_1$. Similarly, the rear wheels are moved in the vertical directions by passing through the unevenness. A vertical moved amount of the axle of the rear wheels caused here is $Z_2$. Here, when the unevenness of the road surface is expressed by, for example, the sin function, the vertical moved amount $Z_1$ of the axle of the front wheels and the vertical moved amount $Z_2$ of the axle of the rear wheels are expressed by the following Equations 1 and 2, respectively. Note that, "$\omega$" in each of the equations is an angular frequency of the vertical moved amounts $Z_1$ and $Z_2$. Further, "t" in each of the equations is time.

$$Z_1 = A\sin\omega\left(t + \frac{L_1}{V}\right) \tag{1}$$

$$Z_2 = A\sin\omega\left(t - \frac{L_2}{V}\right) \tag{2}$$

By performing second differential on Equations 1 and 2 with respect to the time t, the following Equations 3 and 4 can be obtained. Equation 3 expresses the vertical acceleration of the axle of the front wheels, and Equation 4 expresses the vertical acceleration of the axle of the rear wheels.

$$\frac{d^2}{dt^2}Z_1 = -A\omega^2\sin\omega\left(t + \frac{L_1}{V}\right) \tag{3}$$

$$\frac{d^2}{dt^2}Z_2 = -A\omega^2\sin\omega\left(t - \frac{L_2}{V}\right) \tag{4}$$

An angle formed by the front and rear axis of the vehicle body with the horizontal plane is a pitch angle $\theta$. When one of the axle of the front wheels and the axle of the rear wheels is moved in the vertical directions, the vehicle body turns centering on the lateral axis, and thus the pitch angle $\theta$ changes. When the pitch angle $\theta$ is sufficiently small, the small-angle approximation can be used and the pitch angle $\theta$ can be obtained by the following Equation 5.

$$\theta = \frac{Z_2 - Z_1}{2L} = -\frac{A}{2L}\left\{\sin\omega\left(t + \frac{L_1}{V}\right) - \sin\omega\left(t - \frac{L_2}{V}\right)\right\} \tag{5}$$

By differentiating Equation 5 with respect to the time t, the following Equation 6 expressing the pitch angular velocity (changing speed of pitch angle $\theta$) is obtained.

$$\frac{d\theta}{dt} = -\frac{A\omega}{2L}\left\{\cos\omega\left(t + \frac{L_1}{V}\right) - \cos\omega\left(t - \frac{L_2}{V}\right)\right\} \tag{6}$$

By organizing Equation 6 through using the summation and product formulas, the following Equation 7 can be obtained.

$$\frac{d\theta}{dt} = \underbrace{\frac{A\omega}{L} \cdot \sin\omega\left(\frac{-(L_1+L_2)}{2V}\right)}_{(a)} \cdot \underbrace{\sin\omega\left(t + \frac{L_1-L_2}{2V}\right)}_{(b)} \tag{7}$$

Here, since the part (a) in Equation 7 is a constant, it can be understood that the pitch angular velocity can be expressed by the sin function, and a phase thereof can be expressed by the part (b). Therefore, it can be understood that a time difference $\Delta\tau$ expressed by the following Equation 8 exists between the vertical acceleration of the axle of the front wheels (Equation 3) and the pitch angular velocity of the vehicle body (Equation 7).

$$\Delta\tau = \frac{L_1}{V} - \frac{L_1 - L_2}{2V} = \frac{L_1 + L_2}{2V} = \frac{1}{2} \cdot \frac{2L}{V} \tag{8}$$

By modifying Equation 8, the following Equation 9 expressing the moving velocity V of the vehicle body is obtained. As it can be understood from Equation 9, the moving velocity V of the vehicle body can be obtained based on a rate of the wheelbase 2L with respect to the time difference $\Delta\tau$. Therefore, by detecting the time difference $\Delta\tau$ with, for example, a sensor, the moving velocity V can be calculated.

$$V = \frac{1}{2} \cdot \frac{2L}{\Delta\tau} = \frac{L}{\Delta\tau} \tag{9}$$

Based on the principle of the velocity calculating method described above (Equation 9), the navigation device 1 of this embodiment is configured to calculate the moving velocity V based on the rate of the wheelbase 2L with respect to the time difference $\Delta\tau$. Thus, the navigation device 1 of this embodiment can obtain the moving velocity of the vehicle body without depending on the GPS signals.

The moving velocity V calculated based on Equation 9 is a velocity (absolute velocity) with respect to the road surface (traveling surface), and therefore, an error of the velocity is smaller than the conventional method of obtaining the change rate of the velocity (relative moving velocity) by integrating the outputs of the acceleration sensor, for example. As described above, according to the velocity calculating method of the present application, the navigation device 1 can accurately obtain the absolute velocity of the vehicle body without depending on the GPS signals.

Further, since Equation 9 described above is derived based on an apparent vehicle body model, the applicable range is more explicit compared to Equation 1 described in Patent Document 1 and Equation 9 has a higher reliability. Specifically, if the vehicle body can be assumed to be a rigid body and has the front and rear wheels, the moving velocity can be obtained by applying Equation 9 described above. Therefore, it can be understood that without limiting to general four-wheeled automobiles, Equation 9 is also applicable to three-wheeled automobiles and two-wheeled vehicles, such as motorcycles. Further, even if the vehicle body has three or more wheels in the longitudinal directions, such as a bus or a truck, Equation 9 can be applied by assuming one of the wheels as the front wheel and another one of the wheels as the rear wheel.

Note that, the wheelbase 2L which is the parameter of Equation 9 described above is constant regardless of the mode of the posture change of the vehicle body. Therefore, regardless of the position centering on which the vehicle body turns (the position on which the pitch angular velocity causes effect), the moving velocity V of the vehicle body can be calculated by using Equation 9 described above.

Next, a configuration to obtain the time difference $\Delta\tau$(time difference between the vertical acceleration of the axle of the front wheels and the pitch angular velocity of the vehicle body) in the navigation device 1 of this embodiment is described.

As described above, the navigation device 1 of this embodiment has the angular velocity sensor 7 detectable of the pitch angular velocity, inside the case of the main body 2. Further, as described above, the navigation device 1 of this embodiment has the acceleration sensor 6 detectable of the vertical acceleration, inside the case of the main body 2. The angular velocity acquiring module 11 acquires the data of the pitch angular velocity of the vehicle body (hereinafter, simply referred to as the "pitch angular velocity") based on the output of the angular velocity sensor 7 (angular velocity acquiring process). Further, the acceleration acquiring module 10 acquires the data of the vertical acceleration of the axle of the front wheels (hereinafter, simply referred to as the "vertical acceleration") based on the output of the acceleration sensor 6 (acceleration acquiring process).

The autonomous navigation module 21 obtains a digital signal waveform indicating a change of the vertical acceleration of the axle of the front wheels over time (waveform expressed by Equation 3), by acquiring the data of the vertical acceleration outputted by the acceleration acquiring module 10 in order of time. Further, the autonomous navigation module 21 obtains a digital signal waveform indicating a change of the pitch angular velocity of the vehicle body over time (waveform expressed by Equation 7), by acquiring the data of the pitch angular velocity outputted by the angular velocity acquiring module 11 in order of time.

The autonomous navigation module 21 of this embodiment has a function as the time difference detecting module 23 configured to acquire a difference between the two signal waveforms in the time axial direction (time difference $\Delta\tau$ in Equation 8).

Figure 3:
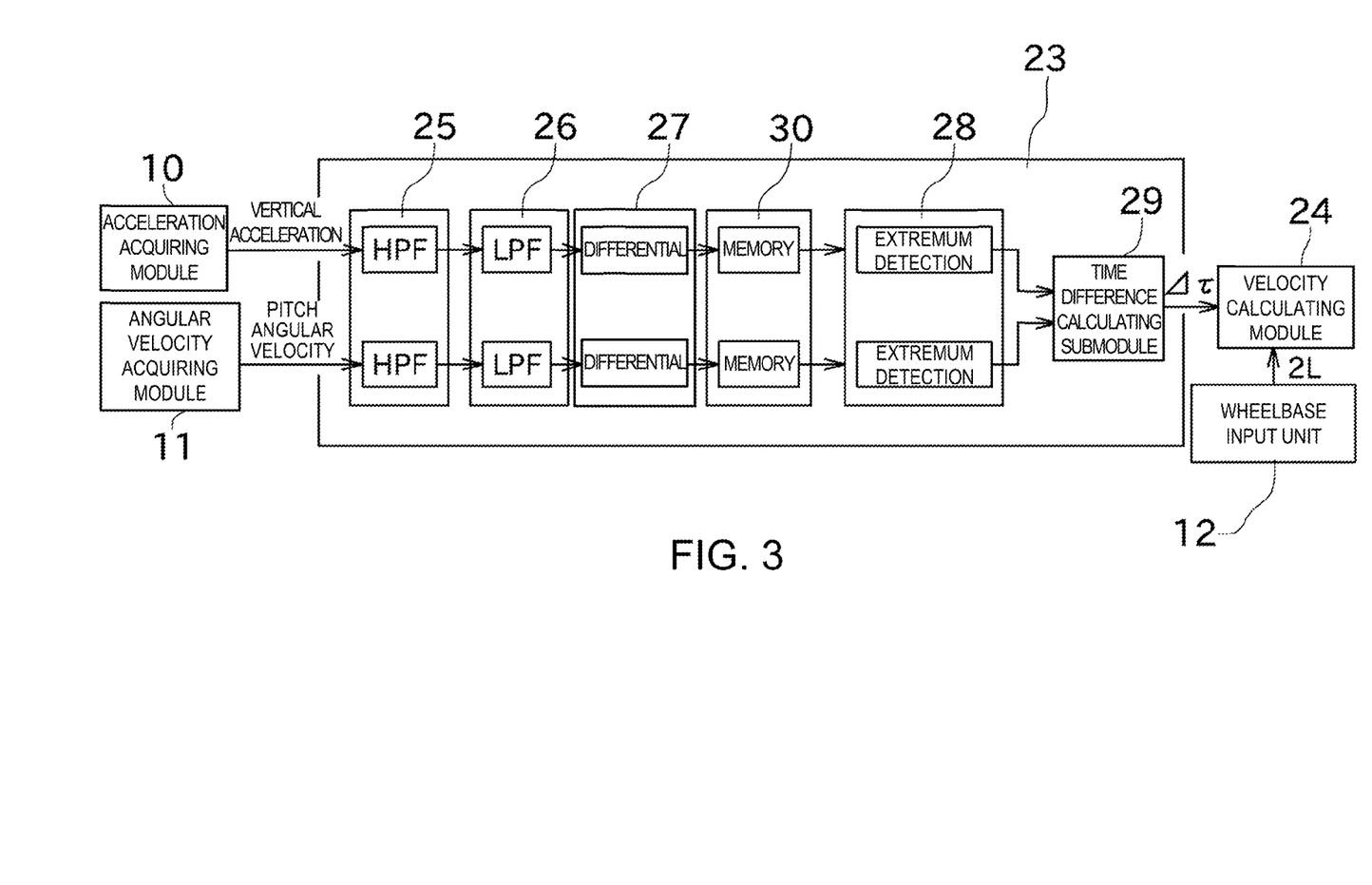
FIG. 3 is a block diagram illustrating a flow of processing at a time difference detecting module.

To obtain the time difference $\Delta\tau$ between the two signal waveforms, for example, one of the signal waveforms may be gradually shifted in the time axial direction, and a shift amount when correlation between the signal waveforms reaches its highest peak may be obtained. Note that, if the processing of obtaining the correlation between the digital signal waveforms by shifting the entire digital signal waveforms is repeated, it requires corresponding calculation time, which causes higher operation load. Therefore, the time difference detecting module 23 of this embodiment detects extremums of the two signal waveforms, and obtains a difference in timings at which the extremums are detected, respectively, as the time difference $\Delta\tau$.

Hereinafter, a functional configuration of the time difference detecting module 23 is described with reference to the block diagram in FIG. 3. The time difference detecting module 23 has functions as a high-pass filter 25, a low-pass filter 26, a differential processing submodule 27, an extremum detecting submodule 28, and a time difference calculating submodule 29.

The high-pass filter 25 removes an unnecessary low-frequency component from each of the signal waveform of the vertical acceleration and the signal waveform of the pitch angular velocity. The low-pass filter 26 removes an unnecessary high-frequency component from each of the signal waveform of the vertical acceleration and the signal waveform of the pitch angular velocity.

Note that, based on experiments conducted by the present inventors, it has been discovered that each of the changes in the vertical acceleration and the pitch angular velocity due to the unevenness of the road surface has a frequency of about 1 to 2 Hz. Thus, the high-pass filter 25 of this embodiment is configured to remove low-frequency components below 1 Hz (e.g., offset components) included in the signal waveforms. Further, the low-pass filter 26 of this embodiment is configured to remove high-frequency components above 2 Hz (e.g., vibration of the main body of the navigation device) included in the signal waveforms.

The differential processing submodule 27 differentiates, with respect to time, each of the signal waveforms after the unnecessary band ranges are removed therefrom by the high-pass and low-pass filters 25 and 26. The differential processing submodule 27 obtains a difference between a value of data of the signal waveform at a certain timing and a value of data of the signal waveform at a timing immediately preceding to the data at the certain timing in the time axial direction, as a differential value for the certain timing. The differential processing submodule 27 obtains the differential values of the signal waveforms of the vertical acceleration and the pitch angular velocity of respective timings, and saves the differential values in a buffer memory 30 in order of time.

The extremum detecting submodule 28 is configured to detect a timing at which the vertical acceleration reaches its extremum (timing at which the differential value becomes zero) and a timing at which the pitch angular velocity reaches its extremum (timing at which the differential value becomes zero), respectively, by referring to the differential values stored in the buffer memory 30. Note that, since the differential values stored in the buffer memory 30 are discrete data, the existence of data of which the differential values are exactly zero is not definite. Therefore, in the actual processing of the extremum detecting submodule 28, the timings at which the differential values stored in the buffer memory 30 become closest to zero, respectively, are searched for. Specifically, the extremum detecting submodule 28 of this embodiment searches for the timing at which the differential value of the signal waveform of the vertical acceleration becomes closest to zero, and sets the searched timing to the timing at which the vertical acceleration reaches its extremum. Further, the extremum detecting submodule 28 searches for the timing at which the differential value of the signal waveform of the pitch angular velocity becomes closest to zero, and sets the searched timing to the timing at which the pitch angular velocity reaches its extremum.

Note that as described above, since the unnecessary band ranges are removed by the high-pass and low-pass filters 25 and 26 in this embodiment, respectively, the signal waveforms can be considered to be waves between 1 and 2 Hz. Assuming that the signal waveforms are waves at 2 Hz, the extremums of the signal waveforms surely exist within 0.5 second. In this embodiment, since the sampling cycle is 100 Hz, the data of fifty differential values is obtained within 0.5 second. Therefore, the extremum detecting submodule 28 of this embodiment only needs to search for the data closest to zero among the data of fifty differential values stored in the buffer memory 30. As the method of searching for the data closest to zero, all the fifty pieces of data may be searched through, or the method of bisection may be utilized, for example.

The difference between the timing at which the vertical acceleration reaches its extremum and the timing at which the pitch angular velocity reaches its extremum may be considered to indicate the shift amount between the vertical acceleration and the pitch angular velocity in the time axial direction (time difference $\Delta\tau$). Therefore, the time difference calculating submodule 29 is configured to calculate the difference between the timing at which the vertical acceleration reaches its extremum and the timing at which the pitch angular velocity reaches its extremum, as the time difference $\Delta\tau$ (time difference detecting process). As described above, the time difference detecting module 23 can detect the time difference $\Delta\tau$ between the vertical acceleration of the axle of the front wheels and the pitch angular velocity of the vehicle body.

Further, the velocity calculating module 24 calculates the moving velocity V of the vehicle body based on the rate of the wheelbase 2L with respect to the time difference $\Delta\tau$ detected by the time difference detecting module 23 (Equation 9) (velocity calculating process). Since the navigation device 1 of this embodiment can calculate the moving velocity V of the vehicle body based on the rate of the wheelbase 2L with respect to the time difference $\Delta\tau$ as described above, it can be said that the navigation device 1 is the velocity calculating device.

Note that, to calculate the moving velocity V based on Equation 9, the information of the distance between the axle of the front wheels and the axle of the rear wheels (wheelbase 2L) is required. As illustrated in FIG. 1, the navigation device 1 of this embodiment includes a wheelbase input unit 12. A user suitably operates the wheelbase input unit 12 to input the distance between the axle of the front wheels and the axle of the rear wheels (wheelbase 2L) into the navigation device 1 before use. The velocity calculating module 24 calculates the moving velocity V based on the wheelbase 2L inputted by the user.

Next, the position on which the main body 2 of the navigation device 1 of this embodiment is mounted is briefly examined.

Specifically, the navigation device 1 of this embodiment is configured to detect the pitch angular velocity of the vehicle body and the vertical acceleration of the axle of the front wheels based on the acceleration sensor 6 and the angular velocity sensor 7 built in the main body 2, and calculate the moving velocity of the vehicle body based on the detected pitch angular velocity and vertical acceleration. Thus, the main body 2 of the navigation device 1 needs to be mounted at a position where the pitch angular velocity of the vehicle body and the vertical acceleration of the axle of the front wheels can appropriately be detected, respectively.

In this regard, since the vehicle body is assumed to be the rigid body in the model of FIG. 2, no matter where the angular velocity sensor 7 is disposed in the vehicle body, the value of the pitch angular velocity detected by the angular velocity sensor 7 does not vary. Therefore, in view of the pitch angular velocity detection, the mounted position of the main body 2 of the navigation device 1 is not particularly limited.

On the other hand, to detect the vertical acceleration of the front wheels by the acceleration sensor 6, the acceleration sensor 6 needs to be disposed near immediately above the axle of the front wheels. Therefore, in view of accurately detecting the vertical acceleration of the axle of the front wheels, the main body 2 of the navigation device 1 is preferably disposed near immediately above the axle of the front wheels as much as possible.

Note that, as described above, with the velocity calculating method of this embodiment, since only the acquisition of the timing at which the vertical acceleration of the front wheels reaches its extremum is required, it is adequate as long as the direction of the change in the vertical acceleration is found. In this case, the main body 2 of the navigation device 1 of this embodiment is not necessarily disposed immediately above the axle of the front wheels. In other words, since the vehicle body is assumed to be the rigid body in the model of FIG. 2, if the acceleration sensor 6 is located forward of the center of gravity C of the vehicle body, the direction in which the vertical acceleration of the axle of the front wheels is changed can be detected by the acceleration sensor 6.

As a result, the mounted position of the main body 2 of the navigation device 1 of this embodiment is considered suitable as long as it is forward of the center of gravity C of the vehicle body, and is not particularly limited otherwise.

In consideration of the above situations, the main body 2 of the navigation device 1 of this embodiment is disposed forward of a driver's seat of the automobile, on a dashboard (position indicated by the dashed line in FIG. 2). Thus, the main body 2 of the navigation device 1 can be disposed at a position where the driver can easily check the display screen 4 and the vertical acceleration of the front wheels can easily be detected by the acceleration sensor 6.

As described above, the navigation device 1 of this embodiment includes the acceleration acquiring module 10, the angular velocity acquiring module 11, the time difference detecting module 23, and the velocity calculating module 24. The acceleration acquiring module 10 acquires the vertical acceleration of one of the axle of the front wheels and the axle of the rear wheels. The angular velocity acquiring module 11 acquires a pitch angular velocity of the automobile. The time difference detecting module 23 detects the time difference $\Delta\tau$ between the vertical acceleration and the pitch angular velocity. The velocity calculating module 24 calculates the moving velocity of the vehicle body based on the rate of the wheelbase 2L with respect to the time difference $\Delta\tau$.

Specifically, the front wheels and rear wheels of the vehicle body are moved in the vertical directions because of the unevenness of the road surface, and as a result, the pitch angle of the vehicle body changes. Therefore, the time difference according to the moving velocity of the vehicle body with respect to the road surface and the wheelbase is generated between one of the vertical acceleration of the front wheels and the vertical acceleration of the rear wheels, and the pitch angular velocity of the vehicle body. Thus, the moving velocity V (absolute velocity) of the vehicle body with respect to the road surface can accurately be calculated based on the rate of the wheelbase 2L with respect to the time difference $\Delta\tau$.

Figure 4:
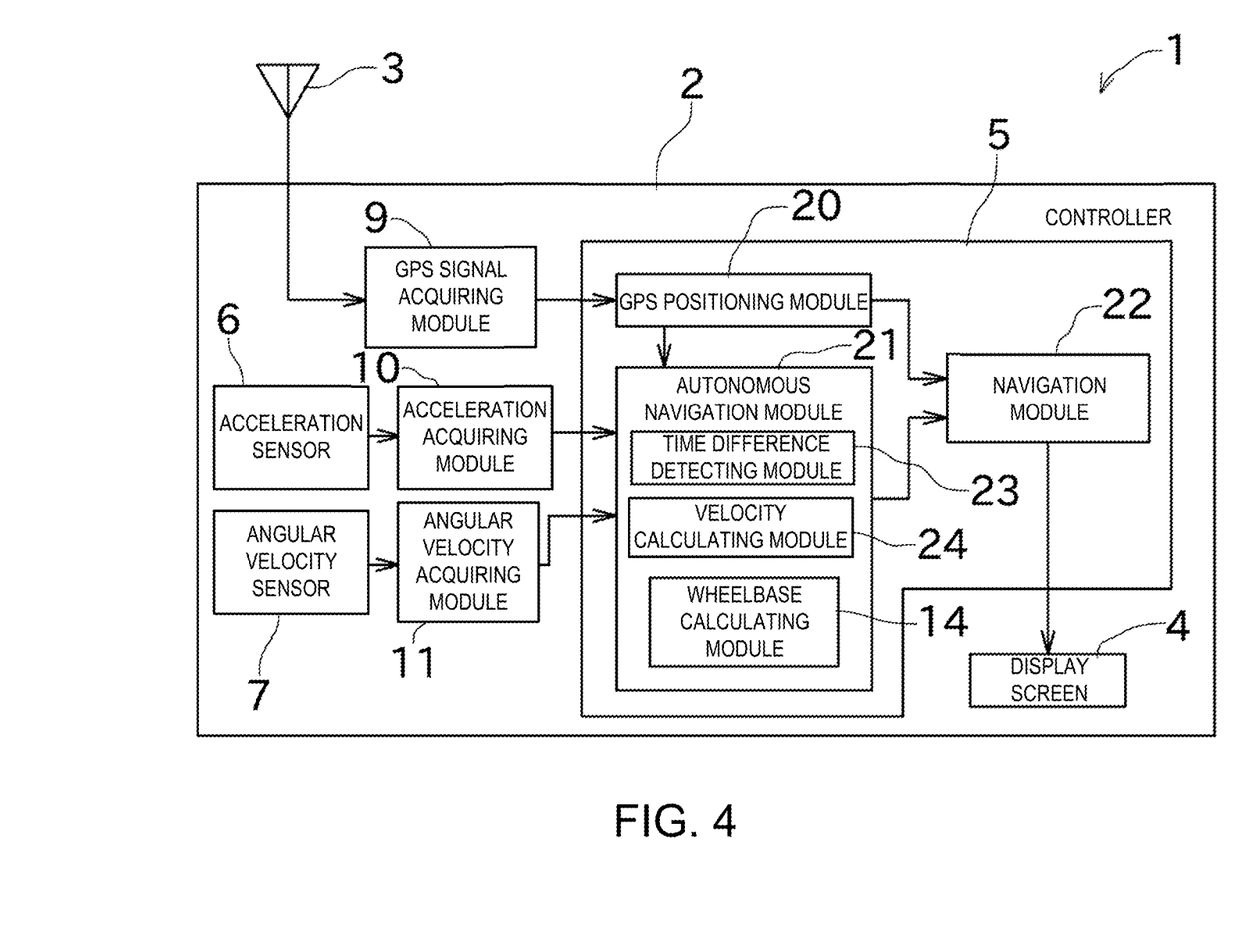
FIG. 4 is a block diagram of a navigation device in a modification.

Next, a modification of the above embodiment is described with reference to FIG. 4. Note that, the configuration same as/similar to that in the above embodiment is denoted with the same reference numeral in FIG. 4 and the description thereof is omitted.

In the above embodiment, the distance between the axle of the front wheels and the axle of the rear wheels (wheelbase 2L) is inputted by the user before use. However, with this configuration, in a case where the user does not input the wheelbase 2L or an incorrect wheelbase 2L is inputted, an accurate moving velocity V cannot be calculated by the velocity calculating module 24. Therefore, preferably a function of automatically setting the wheelbase 2L is provided alternatively to/in addition to the configuration in which the user inputs the wheelbase 2L.

As described above, with the navigation device of the above embodiment, in the case where the GPS signals are successfully and appropriately received by the GPS antenna 3, the moving velocity of the vehicle body (GPS velocity $V_{GPS}$) can be obtained by the GPS positioning module 20. By substituting the GPS velocity $V_{GPS}$ obtained by the GPS positioning module 20 as the moving velocity V in Equation 9 to modify, the following Equation 10 can be obtained. In other words, a distance L can be estimatedly calculated by using Equation 10 if the GPS velocity $V_{GPS}$ and the time difference $\Delta\tau$ are found.

$$L = V_{GPS} \cdot \Delta\tau \quad (10)$$

Thus, the autonomous navigation module of this modification includes a wheelbase calculating module 14 configured to calculate the distance L based on Equation 10.

In the case where the GPS signals are successfully and appropriately received by the GPS antenna 3, the GPS positioning module 20 calculates the GPS velocity $V_{GPS}$ based on the GPS signals. The time difference detecting module 23 calculates the time difference $\Delta\tau$ between the vertical acceleration of the axle of the front wheels and the pitch angular velocity of the vehicle body, when the GPS velocity $V_{GPS}$ is calculated by the GPS positioning module 20. Further, the wheelbase calculating module 14 calculates the distance L by substituting the GPS velocity $V_{GPS}$ and the time difference $\Delta\tau$ in Equation 10. The value of the distance L calculated by the wheelbase calculating module 14 is stored in a suitable memory range. Note that, since the value of the distance L calculated in the above manner is half the value of the wheelbase 2L, it can be said that substantially, the wheel base 2L is calculated.

Further, in the case where the GPS signals are no longer successfully and appropriately received by the GPS antenna, the autonomous navigation module 21 calculates the moving velocity V by substituting the value of the distance L calculated by the wheelbase calculating module 14 in Equation 9.

As described above, the navigation device 1 of this modification calculates the wheelbase 2L (or distance L which is half thereof) while the GPS signals are successfully and appropriately be received, and when the GPS signals are no longer successfully and appropriately received, the navigation device 1 calculates the moving velocity V based on the wheelbase calculated before use. Thereby, for example even in a case where the wheelbase is not set by the user, the moving velocity V can be calculated by the autonomous navigation module 21. Note that, in the case where the wheelbase is already set by the user, one of the value set by the user and the value calculated by the wheelbase calculating module 14 to be used in the calculation of the moving velocity V may be set.

Note that, since the vehicle body is considered to be the rigid body in the model of FIG. 2, the distance L is always constant. However, the distance L in an actual vehicle body is considered as a parameter that receives influence from a variation in the position of center of gravity, a change in vehicle body weight, etc., and changes according to the situation. Thus, the wheelbase calculating module 14 preferably performs the calculation of the distance L periodically (non-periodically), and updates the value stored in a previous calculation with the newly calculated value. Thereby, the velocity calculating module 24 can calculate the moving velocity V by using a suitable value of the distance L according to the change in the situation of the vehicle body, and therefore, the accuracy of the moving velocity V calculated by the velocity calculating module 24 can be improved.

Next, another modification of the above embodiment is described.

In the above example, Equation 9 is derived with the constant moving velocity V; however, the moving velocity V can be calculated more accurately by taking the acceleration into consideration. With the model of FIG. 2, a case where the limitation that the moving velocity V is constant is removed and the longitudinal acceleration (acceleration of the vehicle body in the longitudinal directions) is $\alpha$, is described. In this case, the vertical moved amount $Z_1$ of the axle of the front wheels and the vertical moved amount $Z_2$ of the axle of the rear wheels are expressed by the following equations, respectively. Note that, "$\Delta t$" in each of the equations is a time length required for the rear wheels to pass through a certain location from when the front wheels pass through the location.

$$Z_1 = A\sin\omega\left(t + \frac{L_1}{V_1}\right)$$

$$Z_2 = A\sin\omega\left(t - \frac{L_2}{V_2}\right)$$

$$V_2 = V_1 + \alpha \cdot \Delta t$$

The pitch angular velocity of the vehicle body is expressed by the following equation.

$$\theta = \frac{Z_2 - Z_1}{2L} = -\frac{A}{2L}\left\{\sin\omega\left(t + \frac{L_1}{V_1}\right) - \sin\omega\left(t - \frac{L_2}{V_2}\right)\right\}$$

$$\frac{d\theta}{dt} = -\frac{A\omega}{2L}\left\{\cos\omega\left(t + \frac{L_1}{V_1}\right) - \cos\omega\left(t - \frac{L_2}{V_2}\right)\right\}$$

$$= \frac{A\omega}{L} \cdot \sin\omega\left(\frac{1}{2}\left(\frac{L_1}{V_1} + \frac{L_2}{V_2}\right)\right) \cdot \sin\omega\left(t + \frac{1}{2}\left(\frac{L_1}{V_1} - \frac{L_2}{V_2}\right)\right)$$

Therefore, the time difference $\Delta\tau$ between the vertical acceleration of the axle of the front wheels and the pitch angular velocity of the vehicle body is expressed as follows.

$$\Delta\tau = \frac{L_1}{V_1} - \frac{1}{2}\left(\frac{L_1}{V_1} - \frac{L_2}{V_2}\right)$$

$$= \frac{1}{2}\left(\frac{L_1}{V_1} + \frac{L_2}{V_2}\right)$$

$$= \frac{1}{2}\left(\frac{L_1}{V_1} + \frac{L_2}{V_1 + \alpha \cdot \Delta t}\right)$$

$$= \frac{1}{2}\left(\frac{L_1(V_1 + \alpha \cdot \Delta t) + L_2 V_1}{V_1(V_1 + \alpha \cdot \Delta t)}\right)$$

By modifying the above equation to organize it with $2L = L_1 + L_2$, the following relationship can be obtained.

$$V_1^2 + \left(\alpha\Delta t - \frac{L}{\Delta\tau}\right) \cdot V_1 - \frac{L_1 \alpha \cdot \Delta t}{2\Delta\tau} = 0$$

The following Equation 11 can be obtained by the quadratic formula.

$$V_1 = \frac{-\left(\alpha\Delta t - \frac{L}{\Delta\tau}\right) \pm \sqrt{\left(\alpha\Delta t - \frac{L}{\Delta\tau}\right)^2 + \frac{2L_1\alpha\cdot\Delta t}{\Delta\tau}}}{2} \quad (11)$$

$$= \frac{-\left(\alpha\Delta t - \frac{L}{\Delta\tau}\right) \pm \sqrt{(\alpha\Delta t)^2 - \frac{\alpha\cdot\Delta t\cdot(L_1 - L_2)}{\Delta\tau} + \left(\frac{L}{\Delta\tau}\right)^2}}{2}$$

The velocity calculating module 24 of this modification obtains moving velocities $V_1$ by substituting values of the distance L, the time difference $\Delta\tau$, the longitudinal acceleration $\alpha$, etc., in Equation 11. Although two moving velocities $V_1$ can be obtained from Equation 11, the one that is a positive value may be adopted.

The value of the longitudinal acceleration $\alpha$ can be acquired by the acceleration acquiring module 10 (therefore, the acceleration acquiring module 10 may be referred to as the longitudinal acceleration acquiring module). Here, the value of the longitudinal acceleration acquired by the acceleration acquiring module 10 at a certain timing t is $\alpha(t)$. Since the acceleration acquiring module 10 of this embodiment samples the output signal of the acceleration sensor 6 at the sampling cycle of 100 Hz, the value of the longitudinal acceleration $\alpha$ can be acquired in every 0.01 second. When the timing at which the vertical acceleration reaches its extremum is $t_1$, and the timing at which the pitch angular velocity reaches its extremum is $t_2$, $\alpha$ and $\Delta\tau$ in Equation 11 can be obtained based on the following equation.

$$\alpha\cdot\Delta t = \sum_{t=t_1}^{t_2}(\alpha(t)\cdot 0.01)$$

Note that, as indicated by the dashed lines in Equation 11, Equation 11 includes the rate of the wheelbase (distance L which is half thereof) with respect to the time difference $\Delta\tau$. Therefore, it can be said that the velocity calculating module 24 of this modification calculates the moving velocity based on the rate of the wheelbase 2L with respect to the time difference $\Delta\tau$, and the longitudinal acceleration $\alpha$.

Since the moving velocity $V_1$ calculated by the velocity calculating module 24 of this modification is obtained in consideration of the longitudinal acceleration $\alpha$, compared to the above embodiment in which the moving velocity V is constant, the moving velocity can be calculated more accurately.

Although the preferred embodiment and modifications thereof are described, the above configurations may be modified as follows.

The GPS navigation device is described as one embodiment of the velocity detecting device; however, without limiting to this, the present application can be broadly utilized for devices configured to detect a moving velocity of a movable body.

Figure 5:
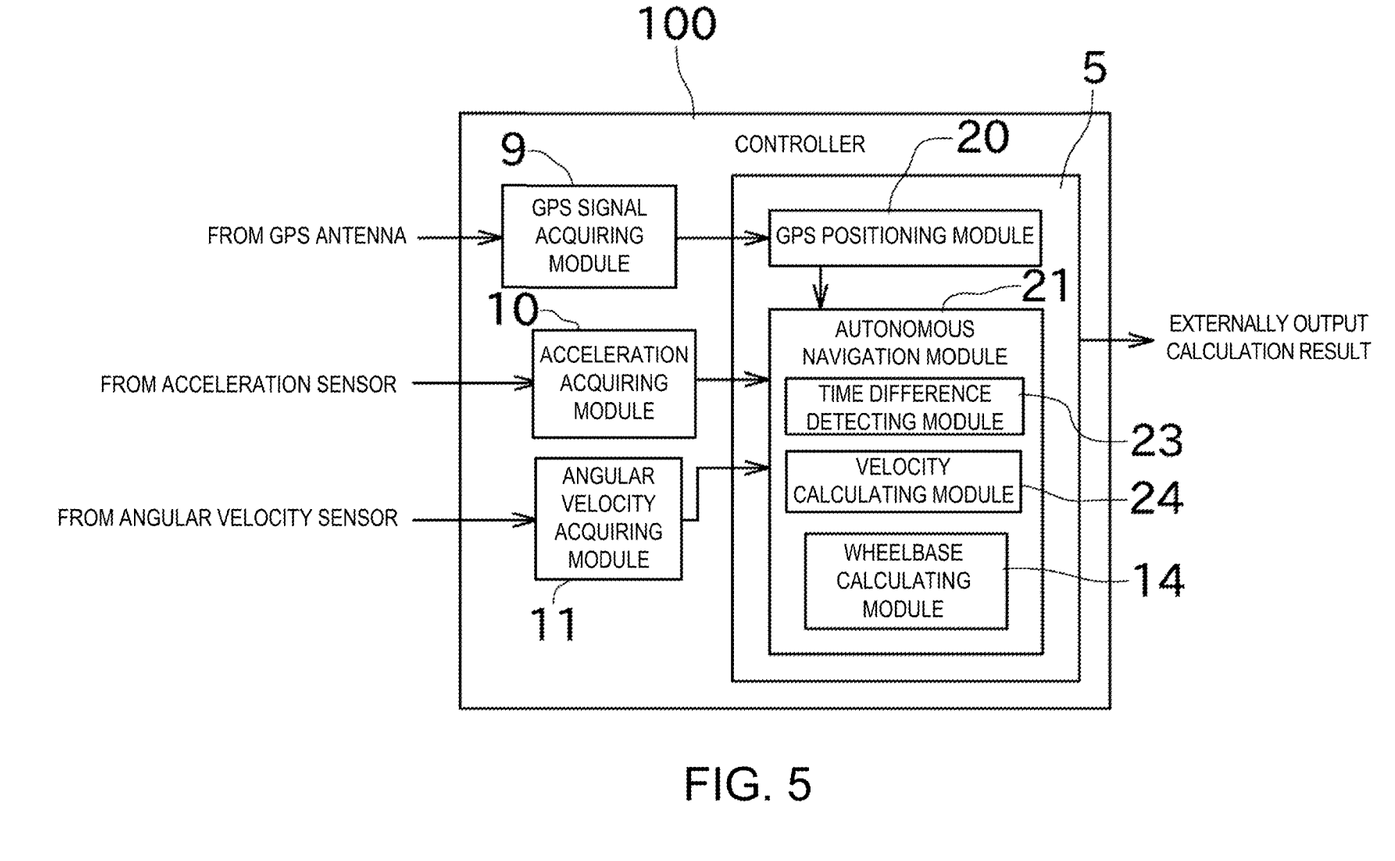
FIG. 5 is a block diagram illustrating a module as another embodiment of the velocity calculating device.

Although the navigation device 1 described above includes the case of the main body 2, the display screen 4, etc., these components are not essential components for the function as the velocity calculating device. Thus, instead of the navigation device 1 itself, a module configured by grouping the components used for the velocity calculation among the components provided to the navigation device 1 may be grasped as the velocity calculating device. One example of such a module 100 that functions as the velocity calculating device is illustrated in FIG. 5. The module 100 is, for example, configured as a substrate module where various kinds of operating elements and electric components are mounted on a substrate, and built in the case of the main body 2 of the navigation device 1. The module 100 includes a GPS signal acquiring module 9, an acceleration acquiring module 10, an angular velocity acquiring module 11, and a controller 5. The module 100 built in, for example, the main body 2 of the navigation device 1 as above may also be grasped as the velocity calculating device. Note that, the module 100 as the velocity calculating device is only required to calculate a moving velocity of a movable body, and therefore, the controller 5 of the module 100 may not have the function as the navigation module 22. In this case, the controller 5 of the module 100 calculates the moving velocity, a current position, etc., of the movable body, and outputs the calculation result to a different module externally provided. The different module performs suitable processing, such as navigation, based on the calculation result received from the module 100.

In the above embodiment, the acceleration sensor 6 is detectable of the accelerations in the three axes; however, this disclosure can be implemented as long as the vertical acceleration can be calculated. Therefore, the acceleration sensor 6 is only required to be detectable of the acceleration in one or more axes. However, in the second modification, since the longitudinal acceleration $\alpha$ needs to be detected in addition to the vertical acceleration, an acceleration sensor detectable of accelerations in two or more axes is needed. Further, the angular velocity sensor 7 is detectable of the angular velocities centering on the three axes; however, this disclosure can be implemented as long as the pitch angular velocity can be detected. Therefore, the angular velocity sensor 7 is only required to be detectable of the angular velocity centering on one or more axes.

In the above embodiment, the acceleration sensor 6 and the angular velocity sensor 7 are built in the case of the main body 2 of the navigation device 1; however, either one or both of the acceleration sensor 6 and the angular sensor 7 may be disposed outside the case of the main body 2. Thereby, the sensor(s) can be disposed separately from the main body 2. Thus, it becomes easy to dispose the sensor(s) at position(s) where the pitch angular velocity and/or the vertical acceleration can easily be detected. For example, by disposing the acceleration sensor 6 at a position in a legroom of a front passenger seat (near the axle of the front wheels), the vertical acceleration of the axle of the front wheels can suitably be detected by the acceleration sensor 6.

In the above embodiment, the moving velocity V is calculated based on the time difference between the vertical acceleration of the axle of the front wheels and the pitch angular velocity of the vehicle body. However, without limiting to this, the moving velocity V may also be calculated based on a time difference between the vertical acceleration of the axle of the rear wheels and the pitch angular velocity of the vehicle body (the derivation of equations is omitted). Since the vertical acceleration of the axle of the rear wheels is detected in this case, the acceleration sensor 6 needs to be disposed rearward of the center of gravity C of the vehicle body.

DESCRIPTION OF REFERENCE NUMERAL(S)

1 Navigation Device (Velocity Calculating Device)
10 Acceleration Acquiring Module 11 Angular Velocity Acquiring Module
20 GPS Positioning Module (GNSS Positioning Module)
21 Autonomous Navigation Module
23 Time Difference Detecting Module
24 Velocity Calculating Module

The invention claimed is:

1. A velocity calculating device to be mounted on a movable body having at least a front wheel and a rear wheel and for moving on a traveling surface, comprising:
   processing circuitry;
   an acceleration sensor operatively coupled to the processing circuitry and configured to sense an acceleration of an axle of one of the front and rear wheels in vertical directions of the movable body; and
   an angular velocity sensor operatively coupled to the processing circuitry and configured to sense a pitch angular velocity of the movable body, wherein
   the processing circuitry is configured:
      to acquire the acceleration of the axle of one of the front and rear wheels in the vertical directions of the movable body;
      to acquire the pitch angular velocity of the movable body;
      to detect a time difference between the acceleration in the vertical directions and the pitch angular velocity; and
      to calculate a moving velocity of the movable body based on a ratio of a wheelbase with respect to the time difference, the wheelbase being a distance between the axle of the front wheel and the axle of the rear wheel,
   wherein the processing circuitry includes a high-pass filter and a low-pass filter configured to remove components of the acceleration in the vertical directions and the pitch angular velocity with frequencies outside a range from 1 Hz to 2 Hz; and
   wherein the acceleration sensor and the angular velocity sensor are incorporated within the velocity calculating device.

2. The velocity calculating device of claim 1, comprising:
   a case configured to accommodate the acceleration sensor, the angular velocity sensor, and the processing circuitry,
   wherein the processing circuitry is further configured to:
      acquire the acceleration in the vertical directions based on an output of the acceleration sensor, and
      acquire the pitch angular velocity based on an output of the angular velocity sensor.

3. The velocity calculating device of claim 2, wherein the processing circuitry is further configured:
   to acquire GNSS signals received from GNSS satellites;
   to perform positioning of a current position of the movable body based on the GNSS signals in a case where the GNSS signals are successfully and appropriately received; and
   to calculate the current position based on the moving velocity, in a case where the GNSS signals are not successfully and appropriately received.

4. The velocity calculating device of claim 3,
   wherein the processing circuitry is further configured:
   to calculate the wheelbase based on the moving velocity and the time difference, and
   to calculate the moving velocity of the movable body based on the ratio of the wheelbase with respect to the time difference.

5. The velocity calculating device of claim 4, wherein the processing circuitry is further configured:
   to acquire an acceleration of the movable body in longitudinal directions thereof, and
   calculate the moving velocity of the movable body based on the ratio of the wheelbase with respect to the time difference, and the acceleration in the longitudinal directions.

6. The velocity calculating device of claim 5, wherein the processing circuitry is configured to obtain the time difference based on a difference between a timing at which the acceleration in the vertical directions reaches an extremum and a timing at which the pitch angular velocity reaches an extremum.

7. The velocity calculating device of claim 4, wherein the processing circuitry is configured to obtain the time difference based on a difference between a timing at which the acceleration in the vertical directions reaches an extremum and a timing at which the pitch angular velocity reaches an extremum.

8. The velocity calculating device of claim 3, wherein the processing circuitry is further configured:
   to acquire an acceleration of the movable body in longitudinal directions thereof, and
   to calculate the moving velocity of the movable body based on the ratio of the wheelbase with respect to the time difference, and the acceleration in the longitudinal directions.

9. The velocity calculating device of claim 2, wherein the processing circuitry is further configured:
   to acquire an acceleration of the movable body in longitudinal directions thereof, and
   to calculate the moving velocity of the movable body based on the ratio of the wheelbase with respect to the time difference, and the acceleration in the longitudinal directions.

10. The velocity calculating device of claim 2, wherein the processing circuitry is further configured to obtain the time difference based on a difference between a timing at which the acceleration in the vertical directions reaches an extremum and a timing at which the pitch angular velocity reaches an extremum.

11. The velocity calculating device of claim 1, wherein the processing circuitry is further configured:
   to acquire GNSS signals received from GNSS satellites;
   to perform positioning of a current position of the movable body based on the GNSS signals in a case where the GNSS signals are successfully and appropriately received; and
   to calculate the current position based on the moving velocity, in a case where the GNSS signals are not successfully and appropriately received.

12. The velocity calculating device of claim 11,
   wherein the processing circuitry is further configured:
      to calculate the wheelbase based on the moving velocity and the time difference, and
      to calculate the moving velocity of the movable body based on the ratio of the wheelbase with respect to the time difference.

13. The velocity calculating device of claim 12, wherein the processing circuitry is further configured:
   to acquire an acceleration of the movable body in longitudinal directions thereof, and
   to calculate the moving velocity of the movable body based on the ratio of the wheelbase with respect to the time difference, and the acceleration in the longitudinal directions.

14. The velocity calculating device of claim 12, wherein the processing circuitry is further configured to obtain the time difference based on a difference between a timing at which the acceleration in the vertical directions reaches an extremum and a timing at which the pitch angular velocity reaches an extremum.

15. The velocity calculating device of claim 11, wherein the processing circuitry is further configured:
   to acquire an acceleration of the movable body in longitudinal directions thereof, and
   to calculate the moving velocity of the movable body based on the ratio of the wheelbase with respect to the time difference, and the acceleration in the longitudinal directions.

16. The velocity calculating device of claim 11, wherein the processing circuitry is further configured to obtain the time difference based on a difference between a timing at which the acceleration in the vertical directions reaches an extremum and a timing at which the pitch angular velocity reaches an extremum.

17. The velocity calculating device of claim 1, wherein the processing circuitry is further configured:
   to acquire an acceleration of the movable body in longitudinal directions thereof, and
   to calculate the moving velocity of the movable body based on the ratio of the wheelbase with respect to the time difference, and the acceleration in the longitudinal directions.

18. The velocity calculating device of claim 17, wherein the processing circuitry is further configured to obtain the time difference based on a difference between a timing at which the acceleration in the vertical directions reaches an extremum and a timing at which the pitch angular velocity reaches an extremum.

19. The velocity calculating device of claim 1, wherein the processing circuitry is further configured to obtain the time difference based on a difference between a timing at which the acceleration in the vertical directions reaches an extremum and a timing at which the pitch angular velocity reaches an extremum.

20. A method of calculating a moving velocity of a movable body having at least a front wheel and a rear wheel and for moving on a traveling surface, comprising:
   at processing circuitry of the movable body:
      acquiring, from an acceleration sensor operatively coupled to the processing circuitry, an acceleration of an axle of one of the front wheel and the rear wheel in vertical directions of the movable body;
      acquiring, from an angular velocity sensor operatively coupled to the processing circuitry, a pitch angular velocity of the movable body;
      detecting a time difference between the acceleration in the vertical directions and the pitch angular velocity; and
      calculating the moving velocity of the movable body based on a ratio of a wheelbase with respect to the time difference, the wheelbase being a distance between the axle of the front wheel and the axle of the rear wheel,
   wherein calculating the moving velocity includes removing components of the acceleration in the vertical directions and the pitch angular velocity with frequencies outside a range from 1 Hz to 2 Hz using a high-pass filter and a low-pass filter of the processing circuitry; and
   wherein the processing circuitry, the acceleration sensor, and the angular velocity sensor are incorporated within a velocity calculating device.

* * * * *